United States Patent [19]

Crouch

[11] 3,840,355

[45] Oct. 8, 1974

[54] PARTIAL OXIDATION OF HYDROCARBONS TO SYNTHESIS GAS

[75] Inventor: William B. Crouch, Whittier, Calif.

[73] Assignee: Texaco Inc., New York, N.Y.

[22] Filed: June 28, 1972

[21] Appl. No.: 266,935

[52] U.S. Cl.................... 48/212, 48/213, 252/373
[51] Int. Cl............................................. C07c 1/02
[58] Field of Search.......... 48/197 R, 200, 212, 213, 48/215; 252/373

[56] References Cited
UNITED STATES PATENTS

| | | | |
|---|---|---|---|
| 2,809,104 | 10/1957 | Strasser et al. | 48/214 |
| 3,620,698 | 11/1971 | Schlinger et al. | 48/200 X |
| 3,620,699 | 11/1971 | Reynolds et al. | 48/212 X |
| 3,738,940 | 6/1973 | Auer et al. | 48/215 X |
| 3,743,488 | 7/1973 | Bogart | 48/215 X |
| 3,743,606 | 7/1973 | Marion et al. | 48/215 X |

*Primary Examiner*—S. Leon Bashore
*Assistant Examiner*—Richard Pace
*Attorney, Agent, or Firm*—T. H. Whaley; C. G. Ries

[57] ABSTRACT

Gaseous mixtures comprising hydrogen and carbon monoxide are produced continuously by the noncatalytic partial oxidation of a dispersion of liquid hydrocarbonaceous fuel in a methane-rich gas carrier, e.g., natural gas, with a free-oxygen containing gas in the reaction zone of a free-flow unpacked gas generator. The effluent gas from the gas generator is produced having a comparatively high reducing ratio. That is, the mole ratio $H_2+CO/H_2O+CO_2$ of the product gas is at least about 10. For a given-soot level, this reducing ratio is greater than the reducing ratio of product gas from a natural gas fired gas generator or the product gas from a liquid hydrocarbon fired gas generator. Further, in comparison with a steam carrier the SCFH of $H_2+CO$ produced per pound of oil feed may be increased about 60%. The product gas may be used as a reducing gas, fuel gas, or as synthesis gas.

8 Claims, No Drawings

PARTIAL OXIDATION OF HYDROCARBONS TO SYNTHESIS GAS

BACKGROUND OF THE INVENTION

1. Field of the Invention

This invention relates to the production of gaseous mixtures comprising principally carbon monoxide and hydrogen. More particularly, it relates to improvements in the partial oxidation process for continuously producing a gas mixture having a reducing ratio of at least 10 and is suitable for use as a reducing gas, fuel gas, or synthesis gas.

2. Description of the Prior Art

The mole ratio ($H_2$+CO/$H_2O$+$CO_2$) of a gas mixture is commonly referred to by the term "reducing ratio." The reducing ratio is a measure of the efficiency of a gas mixture when used as a reductant; and the higher the reducing ratio the greater the efficiency.

Liquid and gaseous hydrocarbon fuels have been reacted with oxygen by partial oxidation with or without steam and without a catalyst to produce gaseous mixtures comprising principally $H_2$ and CO and containing a small amount of $CO_2$, $H_2O$ and particulate carbon. When liquid hydrocarbon fuels such as heavy fuel oil are used without steam as feedstock to the partial oxidation generator, at a soot level of about 2 weight per cent (basis carbon in the feedstock), combustion chamber temperatures become excessive. when steam is added to the feed gas mixture, the reducing ratio is lowered to a range of about 5 to 10. When natural gas is used as the sole feed to the partial oxidation generator, high feed steam preheat levels and high oxygen/fuel ratios are required to reduce the methane content of the product gas to acceptable levels and a reducing ratio in the range of about 5 to 10 may be obtained. These values are substantially lower than those obtained by the process of the subject invention. Similarly, coassigned U.S. Pat. No. 2,698,782 to C. A. Coghlan discloses in the preparation of motor gasoline burning natural gas and oilcarbon slurries with steam injected to moderate excessive combustion temperatures. By such a process the gas produced would have a low reducing ratio.

SUMMARY OF THE INVENTION

A continuous process for producing gaseous mixtures comprising hydrogen and carbon monoxide; including the steps of simultaneously introducing into the reaction zone of a free-flow unpacked non-catalytic gas generator a free-oxygen containing gas, a liquid hydrocarbonaceous fuel, and a methane-rich gas. Preferably, the liquid hydrocarbonaceous fuel is dispersed in the methane-rich gas. Said materials are reacted by partial oxidation in said reaction zone in the absence of externally supplied water at an autogenous temperature in the range of about 1,500° to 3,500°F. and at a pressure in the range of atmospheric to 3,500 psig. The effluent gas stream from said reaction zone comprises $H_2$, CO, $CO_2$ and particulate carbon in the amount of about 0.01 to 30 per cent by weight of carbon in the liquid hydrocarbon; and, it has a mole ratio of $H_2$+CO/$CO_2$+$H_2O$ which is greater than 10.

In the subject invention a synergistic effect is obtained when the methane-rich gas is used as a carrier for the liquid hydrocarbonaceous fuel. Thus, a reducing ratio of at least 10 is obtained. Further, the net gas-make per unit of oil feed is almost doubled by using the subject combustible carrier, in comparison for example, with a noncombustible carrier such as $H_2O$ or $CO_2$. The product gas is suitable for use as a reducing gas, fuel gas, or synthesis gas.

DESCRIPTION OF THE INVENTION

The present invention pertains to improvements in the partial oxidation process for generating a mixture of gases comprising principally hydrogen and carbon monoxide from a liquid hydrocarbonaceous fuel. The product gas mixture, having a reducing ratio, i.e., mole ratio $H_2$+CO/$H_2O$+$CO_2$, of at least 10, is particularly useful as a gas phase reductant for the reduction of metal oxides. The product gas may be also used as a fuel gas or as a synthesis gas.

The term "liquid hydrocarbonaceous fuel" as used herein is intended to include suitable liquid hydrocarbon fuel feedstocks as liquefied petroleum gas; heavy fuel oil, petroleum distillates and residua, gasoline, naphtha, kerosine, crude petroleum, reduced crude, asphalt, gas oil, residual oil, shale oil, tar-sand oil, aromatic hydrocarbons such as benzene, toluene, xylene, coal tar; cycle gas oil from fluid catalytic cracking operations, furfural extract of coker gas oil; aldehydes, ketones, alcohols, organic waste liquors having some fuel value, and mixtures thereof. Hydrocarbon oils having an API gravity less than 10° are preferred for economic reasons. Also included within the definition of liquid hydrocarbonaceous fuel are slurries of solid carbonaceous fuels in at least one of the aforementioned liquid hydrocarbon fuels. Suitable dry solid carbonaceous fuels which may be slurried include petroleum coke, shale, tar sands, and coke from coal.

Prior to being dispersed in the combustible methane-rich gas carrier, the liquid hydrocarbonaceous fuel may be at room temperature or it may be preheated to a temperature up to about 1,200°F., but below its cracking temperature. No steam, $CO_2$ or other type carrier or temperature-moderating gas from an external source is introduced into the system.

The methane-rich carrier gas comprises at least 22 mole per cent methane and is selected from the group of combustible gas phase materials consisting of substantially pure methane (at least 95 mole per cent $CH_4$), natural gas, coke oven gas, and fuel gas comprising principally $H_2$, CO, and at least 22 mole per cent of $CH_4$. The methane-rich gas is substantially dry and has a gross heating value in the range of about 500 to 1,200 British Thermal Units (BTU) per standard cubic foot (SCF).

The temperature of the methane-rich carrier gas prior to being mixed with the liquid hydrocarbonaceous fuel may be in the range of about room temperature to 1,000°F. The weight ratio of methane-rich carrier gas to the liquid hydrocarbonaceous fuel is in the range of about 0.25 to 0.75 and preferably in the range of about 0.4 to 0.6 pounds of combustible carrier gas per pound of liquid hydrocarbonaceous fuel.

In a preferred embodiment the methane-rich carrier gas is a combustible natural gas as recovered from the earth. Natural gas is generally readily available at low cost. As used herein, the term "natural gas" by definition shall include gas mixtures which are combustible and which have a gross heating value in the range of about 400 to 4,000 BTU per SCF. Such dry combustible natural gas mixtures may contain methane in the amount of about 22 to 99.5 mole of dry basis and a gas selected from the group of gases or mixtures thereof shown in Table I.

TABLE I

|  | Mole % (Dry Basis) |
| --- | --- |
| Methane | 22 to 99.5 |
| Ethane | 0 to 30 |
| Propane | 0 to 70 |
| Butane | 0 to 19 |
| Pentane and heavier | 0 to 10 |
| Nitrogen | 0 to 78 |
| Carbon Dioxide | 0 to 5 |
| Hydrogen Sulfide | 0 to 6 |
| Helium | 0 to 2 |

For example, a preferable average natural gas delivered in the pipe line will have a heating value in the range of about 850 to 1,150 BTU per SCF and comprise the following composition in mole per cent dry basis: methane 72.6; ethane 14.4; carbon dioxide 0.5; nitrogen 12.5

The free-oxygen containing gas is selected from the group consisting of substantially pure oxygen (at least about 95 mole per cent of $O_2$), oxygen-enriched air (at least about 22 mole per cent of $O_2$), and air. Such oxygen concentrations are readily available from commercial oxygen plants. The amount of free-oxygen containing gas introduced into the reaction zone is limited so that the amount of free oxygen supplied is such that near maximum yields of carbon monoxide and hydrogen are obtained. Preferably, the atomic ratio of free oxygen/carbon in the fuel feed is in the range of about 0.6 to 1.2.

By means of a multi-passage burner axially aligned in the gas generator, the liquid carbonaceous fuel, free-oxygen containing gas, and methane-rich carrier gas are simultaneously introduced into the reaction zone of the gas generator. The gas generator is a free-flow unpacked noncatalytic refractory lined vertical cylindrical steel pressure vessel. For example, a suitable gas generator is depicted in coassigned U.S. Pat. No. 3,639,261 issued to William L. Slater on February 1, 1972 but modified so that the hot effluent gas from the generator does not contact any water from an external source. Further, an annulus-type burner such as depicted in coassigned U.S. Pat. No. 2,928,460 issued to Du Bois Eastman may be employed to introduce the feed into the reaction zone of the generator. Preferably, the liquid hydrocarbonaceous fuel is finely atomized in the methane-rich carrier stream upstream from the burner. This may be done by conventional means. For example, a stream of methane-rich gas at a temperature in the range of about 50° to 1,000°F. is introduced into a stream of liquid hydrocarbonaceous fuel at a temperature in the range of about 60° to 1,000°F. In general, it is desirable to limit the amount of preheat of liquid hydrocarbon fuel to about 750°F. to prevent cracking.

Atomization of the liquid hydrocarbonaceous fuel may be effected by passing the mixture of liquid hydrocarbonaceous fuel and carrier gas through a relatively long tubular conduit at a velocity in excess of about 20 feet per second, and preferably in excess of 30 feet per second. Preferably, the tubular section in which the dispersion of liquid hydrocarbonaceous fuel in methane-rich gas is accomplished is heated and has a length in the range of about 100 to 500 times the inside pipe diameter so that there is turbulent flow therein.

Thus, for example, a preheated dispersion of liquid hydrocarbon fuel in natural gas may be continuously passed through the annulus passage of an annulus-type burner directly into the reaction zone of the gas generator where the partial oxidation reaction takes place. The annulus-type burner essentially may comprise a center conduit and a concentric tube disposed about the center conduit providing an annular passage therebetween. The downstream or exit end of the concentric tube is preferably provided with a converging nozzle tip, so as to cause the two streams to impinge and mix with each other beyond the burner tip. Preferably, the free-oxygen containing stream is simultaneously and continuously passed through the center conduit to the burner into impinging or mixing relationship with the dispersion of liquid hydrocarbon fuel and natural gas stream flowing through the annulus. The streams contact each other preferably in the reaction zone. Mixing of the streams preferably takes place at a point located from 0 to 6 inches from the downstream face of the burner. This scheme subjects the particles of liquid hydrocarbon fuel to a further degree of subdivision. Alternately, the free-oxygen containing stream may be continuously introduced into the reaction zone by way of the annulus passage of the burner and the stream of liquid hydrocarbon fuel dispersed in natural gas may be introduced by way of the center passage.

The tip velocities for the stream of oxygen containing gas and the stream of liquid hydrocarbonaceous fuel-methane-rich gas dispersion are in the range of about 30 feet per second to sonic velocity, and preferably in the range of about 300 to 600 feet per second. The tip velocities for the several streams are preferably equal.

In another embodiment of the invention, the annulus burner may be provided with a second concentric tube which is disposed about said first concentric tube, providing an outer annulus therebetween. The downstream or exit end of the second concentric tube may preferably be provided with a converging nozzle tip for controlling the direction of the gaseous stream flowing through the outer annulus. It was unexpectedly found that such an arrangement has the economic advantage of reducing the amount of particulate carbon in the product gas for a fixed amount of free oxygen supplied with the free-oxygen containing gas in the feed. The streams flowing in the center passage and inner annulus may be those as previously described. However, the gaseous stream simultaneously flowing in the outer annulus at a velocity of about 30 feet per second to sonic velocity is selected from the group consisting of air, oxygen-enriched air, nitrogen, a portion of the effluent gas from the gas generator that is cooled and recycled, and cooled cleaned and compressed off-gas from an ore reduction zone such as a blast furnace for reducing iron ore to iron. Mixing of the three streams may be facilitated by the converging nozzle tips on said first and second concentric tubes. Preferably, as previously mentioned, such mixing takes place in the reaction zone at a distance of 0 to 6 inches from the face of the burner.

Said three gaseous streams are introduced into the reaction zone of the gas generator in amounts to provide, by partial oxidation, an autogenous reaction temperature in the range of about 1,500° to 3,500°F. at a pressure in the range of about 1 to 250 atmospheres. The hot product gas leaving the reaction zone substantially comprising $H_2$, CO, $CO_2$, $H_2O$, $CH_4$ and a small amount of particulate carbon, may be cooled in a commercially available waste heat boiler. Examples of suitable waste heat boilers are depicted in coassigned U.S. Pat. No. 3,551,347 issued to F. Markert et al. on Dec. 29, 1970 and the aforesaid U.S. Pat. No. 3,639,261.

The composition of the product gas from the subject process is in the following range (mole per cent): $CH_4$ 0 to 2.0; $H_2$ 35.0 to 60.0; CO 35.0 to 60.0; $CO_2+H_2O$ 0 to 7; $N_2$ 0 to 30.0; and $H_2S$ 0 to 5.0. Included in the product gas stream is particulate carbon in the amount of 0 to 30 weight per cent (basis weight of carbon in fuel).

A synergistic effect occurs when natural gas replaces all of the steam as the temperature-moderating gas in the oil-fired partial oxidation process. This effect is demonstrated in Example I below. Thus, when a liquid hydrocarbon fuel feed is entrained in natural gas, there is produced a product gas having a greater reducing ratio than when the feed to the generator is either natural gas alone or liquid hydrocarbon fuel with steam as the carrier. Further, the net gas-make per unit of oil fired is increased.

DESCRIPTION OF THE PREFERRED EMBODIMENTS

The following examples are offered as a better understanding of the present invention but the invention is not to be construed as limited thereto.

EXAMPLE I

A gas mixture comprising principally carbon monoxide and hydrogen is produced by the partial oxidation of a dispersion of heavy fuel oil in natural gas. The heavy fuel oil has an API gravity of 13.1, a gross heating value of 18,300 BTU/pound, and an ultimate analysis in weight percent of C 85.7, $H_2$ 11.2, S 2.1, N 0.8, and ash 0.03. The dispersion of heavy fuel oil and natural gas is reacted with substantially pure oxygen by the process of the present invention in a free-flow noncatalytic synthesis gas generator of the type previously described.

In the process, the dispersion of heavy fuel oil and natural gas, at a temperature of about 300°F., is introduced into the reaction zone of the gas generator by way of the annulus of a conventional annulus-type burner. The oxygen, at a temperature of about 100°F., is introduced into the reaction zone by way of the center conduit of the burner. No supplemental water is introduced into the reaction zone other than that which may be produced from the aforesaid charge. On an hourly basis, a summary of the materials, operating conditions, composition of product gas, and performance data are shown for Run No. 1 in the following Table II.

Runs 2 and 3 are also shown in Table II for comparative purposes only and do not constitute examples of the subject invention. Run 2 pertains to standard operating procedure for a natural gas fired partial oxidation synthesis gas generator. No temperature-moderating gas is required. Run 3 pertains to operating the gas generator in substantially the same manner as described previously for Run 1 but with steam replacing the natural gas as a carrier for the heavy fuel oil. The ultimate of analysis of the natural gas used as a carrier gas in Run 1 or as a fuel in Run 2 in weight per cent is nitrogen 17.72, carbon 61.95, hydrogen 19.53, and oxygen 0.80.

Runs 1 – 3 have equivalent residence times in the reaction zone at constant pressure. With no carrier gas, the reaction of an oil-fired partial oxidation generator would reach excessively high temperature, e.g., above 4,000°F. and the refractory lining would fail. When steam alone was used as the carrier for the fuel oil in Run 3, the reducing ratio of the product gas and the free oxygen consumed per thousand standard cubic feet per hour (M SCFH) of $H_2+CO$ produced fell sharply.

In ordinary practice, no steam or other carrier is used when a methane-rich gas fuel such as the natural gas fuel is reacted as the sole fuel in a partial oxidation gas generator. This is to prevent the autogenous temperature in the reaction zone from falling below the level required to maintain the reaction. However, as shown by the data for Run 2 a large amount of natural gas is consumed in preheating the natural gas and the oxygen/carbon ratio is high.

The unexpected and beneficial results obtained by substituting the methane-rich gas for steam as the carrier for the heavy fuel oil is readily apparent from the data for Run 1. Further, a synergistic effect is obtained. By operating the partial oxidation gas generator with a mixture comprising fuel oil and natural gas, the results obtained are superior to those obtained when fuel oil and natural gas are separately charged to the generator. Note under performance Table II that the product gas quality, i.e., Reducing Ratio for Run No. 1 is higher than that for the other cases. Further, by means of the subject invention, production rates for $H_2 + CO$ are higher in comparison with the steam carrier in Run 3. Also, the SCFH of $H_2+CO$ produced per pound of heavy fuel oil feed is increased in Run 1 by about 60 percent. This represents an economic advantage for the subject invention as the yield is greater for given-sized equipment.

TABLE II

REDUCING GAS GENERATION

| Run No. | 1 | 2 | 3 |
|---|---|---|---|
| Charge to Generator | | | |
| Fuel | | | |
|   Heavy Fuel Oil, lbs./hr. | 340.0 | — | 465.0 |
|   Natural Gas, SCFH | — | 9202* | — |
| Free Oxygen (99.5 mole % $O_2$) SCFH | 7062 | 6089 | 6832 |
| Carrier Gas, SCFH | | | |
|   Natural Gas | 3393 | — | — |
|   Steam | — | — | 2325 |
| Generator Operation | | | |
|   Reaction zone temperature, °F. | 2700 | 2550 | 3000 |
|   Pressure psig | 30 | 30 | 30 |
|   Time in reaction zone, sec. | 1.01 | 1.00 | 1.00 |

TABLE II — Continued

REDUCING GAS GENERATION

| Run No. | 1 | 2 | 3 |
|---|---|---|---|
| Product Gas SCFH (wet basis) | | | |
| Composition, mole % | | | |
| $H_2$ | 46.12 | 53.86 | 38.14 |
| CO | 45.28 | 31.71 | 46.31 |
| $CO_2$ | 1.38 | 1.56 | 3.88 |
| $H_2O$ | 5.01 | 8.64 | 10.81 |
| $CH_4$ | .02 | .02 | .03 |
| $H_2S$ | .30 | — | .44 |
| $N_2$ | 1.74 | 4.10 | .21 |
| A | .13 | .11 | .14 |
| COS | .02 | — | .04 |
| Performance | | | |
| Reducing Ratio, mole ratio $H_2+CO/H_2O+CO_2$ | 14.3 | 8.4 | 5.8 |
| Unconverted Carbon (soot yield), % of C in fuel | 2.00 | 0.4 | 2.00 |
| Free Oxygen/Fuel Ratio, SCF/lb. | 13.6 | 12.7 | 14.6 |
| Carrier/Fuel Ratio, lb./lb. | 0.52 | — | — |
| Oxygen/Carbon Ratio, atom/atom | 1.11 | 1.30 | 1.08 |
| Free Oxygen Consumption, SCF/m SCF $H_2$+CO | 289 | 252 | 328 |
| SCF of $H_2$+CO per lb. of Fuel Oil | 71.4 | — | 44.6 |
| $H_2$ + CO, m SCFH | 24.3 | 24.0 | 20.7 |

*An additional 920 SCFH Natural Gas is required to preheat natural gas feed to 1000°F.

The process of the invention has been described generally and by examples with reference to particular compositions for purposes of clarity and illustration only. It will be apparent to those skilled in the art from the foregoing that various modifications of the process and materials disclosed herein can be made without departure from the spirit of the invention.

I claim:

1. A process for producing gaseous mixtures comprising principally hydrogen and carbon monoxide comprising simultaneously introducing into the reaction zone of a free-flow unpacked noncatalytic gas generator a free-oxygen containing gas, a liquid hydrocarbonaceous fuel, and a methane-rich gas comprising at least 22 mole percent methane; said free-oxygen containing gas comprising 0.6 to 1.2 atoms of free oxygen per atom of carbon in the fuel and from about 0.25 to 0.75 parts by weight of said methane-rich gas are introduced into the reaction zone for each part by weight of said liquid-hydrocarbonaceous fuel; reacting said materials by partial oxidation in said reaction zone in the absence of externally supplied water at an autogenous temperature in the range of about 1,500° to 3,500°F and at a pressure in the range of about 1 to 250 atmospheres; and removing from said reaction zone a product gas stream comprising $H_2$, CO, $H_2O$, $CO_2$ and particulate carbon in the amount of about 0.01 to 30 percent by weight of carbon in the liquid hydrocarbon; wherein the reducing ratio (moles $H_2+CO/H_2O+CO_2$) of said product gas is at least about 10.

2. The process of claim 1 wherein said methane-rich gas is selected from the group consisting of substantially pure methane, natural gas, coke oven gas, and fuel gas comprising principally $H_2$, CO, and $CH_4$.

3. The process of claim 1 wherein said liquid hydrocarbonaceous fuel is selected from the group consisting of liquefied petroleum gas; heavy fuel oil, petroleum distillates and residua, gasoline, naphtha, kerosine, crude petroleum, reduced crude, asphalt, gas oil, residual oil, shale oil, tar-sand oil, aromatic hydrocarbons such as benzene, toluene, xylene, coal tar; cycle gas oil from fluid catalytic cracking operations, furfural extract of coker gas oil; aldehydes, ketones, alcohols, organic waste liquors having some fuel value, and mixtures thereof.

4. The process of claim 1 wherein said liquid hydrocarbonaceous fuel is a slurry comprising a liquid hydrocarbonaceous fuel selected from the group in claim 5 and a dry solid carbonaceous fuel selected from the group consisting of petroleum coke, shale, tar sands, and coke from coal, or coal.

5. The process of claim 1 wherein said free-oxygen containing gas is selected from the group consisting of substantially pure oxygen, oxygen-enriched air, and air.

6. A process for producing reducing gas, fuel gas, or synthesis gas comprising continuously introducing into the reaction zone of a free-flow unpacked noncatalytic gas generator by way of the annulus of an annulustype burner at a velocity in the range of about 30 feet per second to sonic velocity a dispersion comprising from about 0.25 to 0.75 parts by weight of methane-rich gas for each part by weight of a liquid hydrocarbonaceous fuel; simultaneously and continuously introducing into said reaction zone by way of the center conduit of said annulus burner so as to impinge and mix with said dispersion a stream of free-oxygen containing gas at a velocity in the range of about 30 feet per second to sonic velocity, wherein the atomic ratio of free oxygen in said free-oxygen containing gas to carbon in the fuel is in the range of about 0.6 to 1.2; and reacting said materials in said reaction zone in the absence of externally supplied water by partial oxidation at an autogenous temperature in the range of about 1,500° to 3,500°F. and at a pressure in the range of about 1 to 250 atmospheres; whereby a product gas stream is produced having a reducing ratio (moles $H_2+CO/CO_2+H_2O$) of at least 10.

7. A process for producing reducing gas, fuel gas, or synthesis gas in the reaction zone of a free-flow unpacked noncatalytic gas generator provided with an axially aligned annulus-type burner for introducing materials into said reaction zone, wherein said annulus burner comprises a center conduit, an inner annulus passage disposed about and separated from said center conduit and an outer annulus passage disposed about and separated from said inner annulus passage, comprising continuously introducing into said reaction zone by way of said center conduit a first gaseous stream comprising a free-oxygen containing gas selected from the group consisting of air, oxygen-enriched air, and substantially pure oxygen, and where the atomic ratio of free oxygen in said free-oxygen containing gas to carbon in the fuel is in the range of about 0.6 to 1.2; simultaneously and continuously introducing into said reaction zone by way of said inner annulus passage a second gaseous stream comprising a dispersion of about 0.25 to 0.75 parts by weight of methane-rich gas for each part by weight of a liquid hydrocarbonaceous fuel; simultaneously and continuously introducing into said reaction zone by way of said outer annulus a third gaseous stream selected from the group consisting of air, oxygen-enriched air, nitrogen, a portion of the effluent gas from the gas generator that is cooled and recycled, and cooled cleaned and compressed off-gas from an ore reduction zone; and said first, second and third gaseous streams being introduced into said reaction zone at velocities in the range of about 30 feet per second to sonic velocity and in amounts to provide by partial oxidation reaction in the absence of externally supplied water an autogenous reaction temperature in the range of about 1,500° to 3,500°F. at a pressure in the range of about 1 to 250 atmospheres, thereby producing a product gas stream substantially comprising $H_2$, CO, $CO_2$, $H_2O$, $CH_4$, and a small amount of particulate carbon.

8. The process of claim 7 wherein said product gas stream has a reducing ratio (moles $H_2+CO/CO_2+H_2O$) of at least 10.

* * * * *